UNITED STATES PATENT OFFICE.

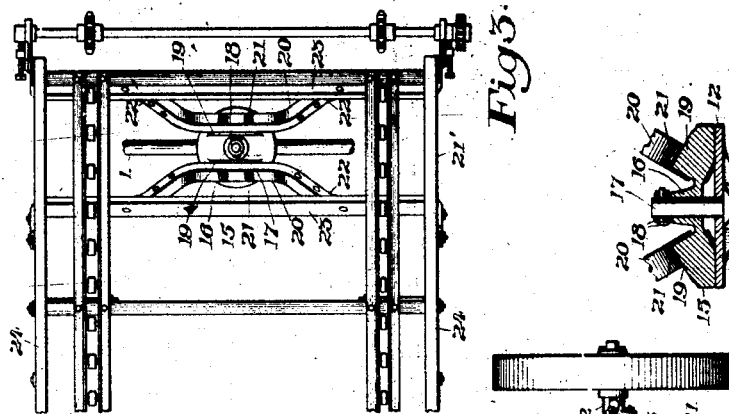
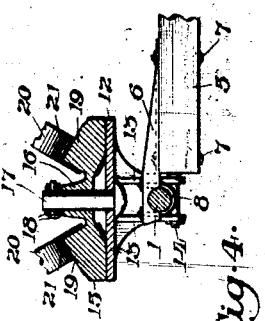
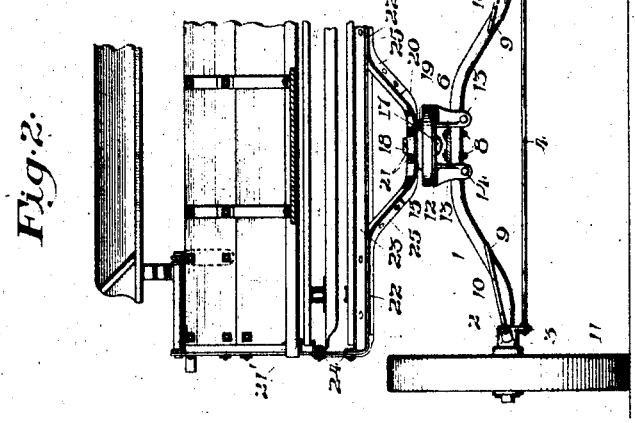
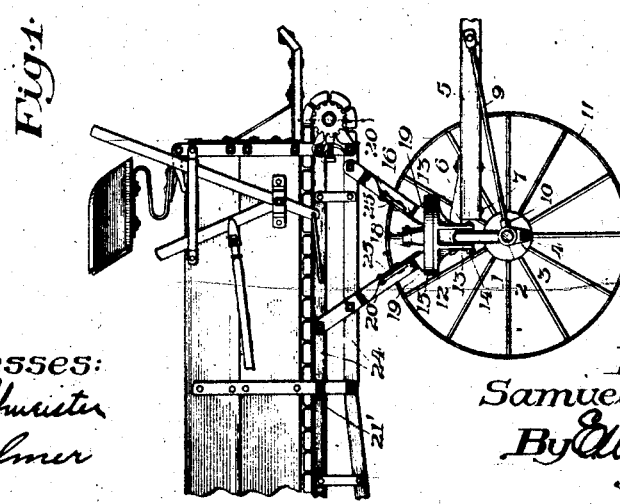

SAMUEL K. DENNIS, OF CHICAGO, ILLINOIS, ASSIGNOR TO INTERNATIONAL HARVESTER COMPANY, A CORPORATION OF NEW JERSEY.

FRONT-BOLSTER AXLE FOR WAGONS.

1,010,600. Specification of Letters Patent. Patented Dec. 5, 1911.

Application filed June 7, 1911. Serial No. 631,675.

*To all whom it may concern:*

Be it known that I, SAMUEL K. DENNIS, a citizen of the United States, residing at Chicago, in the county of Cook and State of Illinois, have invented certain new and useful Improvements in Front-Bolster Axles for Wagons, of which the following is a specification.

My invention relates to wagons or other four-wheeled vehicles, such as manure spreaders, as shown in my application for Letters Patent filed June 20, 1910, and having Serial No. 567,799, and in particular to the means for mounting the receptacle upon the swiveling front wagon truck, including a bolster and fifth wheel mechanism; the object of my invention being to provide a mechanism strong in construction and efficient in operation. I attain this object by means of the mechanism illustrated by the accompanying drawing, in which—

Figure 1 represents a side elevation of the front end of a manure spreader having my improved bolster and swiveling front truck mechanism embodied in its construction, one of the truck wheels being removed; Fig. 2 is a partial end elevation of Fig. 1; Fig. 3 is a top plan view of part of Fig. 1; and Fig. 4 is a vertical section in side elevation of part of Fig. 1 and designed to illustrate the manner of connecting the bolster members with the fifth wheel and axle.

The same reference characters designate like parts throughout the several views.

1 represents an arched axle member having sleeve portions 2 secured to opposite ends thereof, the sleeves being provided at their inner ends with depending ears 3 having openings therein that receive opposite ends of a truss rod 4.

5 represents a draft tongue having its rear end secured to the middle arched portion of the axle by means of a plate 6 secured to the tongue by means of bolts 7 and to the axle by U-bolts 8.

9 represents tongue brace members having their forward ends secured to the tongue and their rear diverging ends provided with threaded portions that are screwed into socket members 10 integral with the sleeves 2, and 11 represents truck wheels journaled upon opposite ends of the axle member.

12 represents a circular plate or fifth wheel having depending leg portions 13 that are provided with saddle portions and forked lower ends that are adapted to partially embrace the arched middle portion of the axle member upon opposite sides of the plate 6 in a manner permitting the axle to rock when the draft tongue is raised or lowered at its front end, and 14 represent pins received by transverse openings in the lower ends of the forked members below the axle member and operative to secure the plate 12 thereto.

15 represents a circular bolster plate having an axially arranged vertical sleeve portion 16 that receives the upper end of a king bolt 17 that connects the bolster plate with the fifth wheel in a rotatable manner.

18 represents a common form of collar and pin mechanism for securing the king bolt in position. The bolster plate is provided with transversely arranged horizontal seat portions 19 upon opposite sides of the king bolt and having angular surfaces adapted to receive the middle portions of bolster members 20 that are secured to the plate by means of bolts 21. The bolster members 20 are angular in cross section and curve upwardly and transversely relative to the vehicle body 21¹ in the form of inverted arches, the front member inclining forward and upward and the rear member rearward and upward and having horizontal portions 22 at opposite sides of the vehicle body whereby they are secured to transverse frame bars 23 forming part of the bed frame of the vehicle body, their upper ends arranged in vertical planes having the two legs of the angle turned together and secured to longitudinally arranged side frame members 24 forming part of said vehicle body, and 25 represents reinforcing bars secured to their depending webs and to the transverse bars 23 of the bed frame.

What I claim as my invention, and desire to secure by Letters Patent, is:

1. A front truck mechanism for vehicles including, in combination, a vehicle body, transversely arranged front bolster bars having opposite ends thereof secured to said body and their body portions curving downward in the form of inverted arches, said arch portions converging at their lower sides, a bolster plate secured to the middle portion of said bars, an arched axle, an axle plate having saddles and depending forked members partially embracing said axle and secured thereto by means of pins passing through openings in the said forked members below said axle, said axle being permitted to rock in said saddles, a king bolt pivotally connecting said axle and bolster plate, a tongue, a plate having its forward end secured to said tongue and its rear end to said axle between said saddle members.

2. A front truck mechanism for vehicles including, in combination, a vehicle body, transversely arranged front bolster bars having opposite ends thereof secured to said body and their body portions curving downward in the form of inverted arches, said arch portions converging at their lower sides, a bolster plate secured to the middle portion of said bars, an arched axle having sleeve portions at opposite ends thereof, a truss rod connecting said sleeve portions, an axle plate secured to the middle portion of said axle in a manner permitting said axle to rock relative to said plate, a king bolt pivotally connecting said axle and bolster plate, a tongue, a plate having its forward end secured to said tongue and its rear end to said axle, and tongue braces having their rear ends adjustably connected with said axle sleeves and their front ends secured to said tongue.

SAMUEL K. DENNIS.

Witnesses:
EVAN EVANS,
HERBERT DEKKER.